United States Patent

(12) United States Patent
Shin et al.

(10) Patent No.: US 11,064,476 B2
(45) Date of Patent: Jul. 13, 2021

(54) CONTROL CHANNEL DECODING DEVICE AND METHOD IN WIRELESS COMMUNICATION SYSTEM

(71) Applicant: Samsung Electronics Co., Ltd., Suwon-si (KR)

(72) Inventors: Myeongcheol Shin, Suwon-si (KR); Seijoon Shim, Seoul (KR); Hayoung Yang, Yongin-si (KR); Chongdon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/464,514

(22) PCT Filed: Nov. 28, 2017

(86) PCT No.: PCT/KR2017/013645
§ 371 (c)(1),
(2) Date: May 28, 2019

(87) PCT Pub. No.: WO2018/097688
PCT Pub. Date: May 31, 2018

(65) Prior Publication Data
US 2019/0380113 A1 Dec. 12, 2019

(30) Foreign Application Priority Data

Nov. 28, 2016 (KR) ........................ 10-2016-0158978

(51) Int. Cl.
*H04W 72/04* (2009.01)
*H04L 1/18* (2006.01)

(52) U.S. Cl.
CPC ............. *H04W 72/042* (2013.01); *H04L 1/18* (2013.01)

(58) Field of Classification Search
CPC ...... H04W 72/042; H04L 1/18; H04L 5/0048; H04L 5/0053; H04L 5/0092; H04L 1/0045; H04L 1/0072; H04L 1/0038
See application file for complete search history.

(56) References Cited

U.S. PATENT DOCUMENTS

2009/0046672 A1* 2/2009 Malladi ................ H04L 1/0067
370/336
2011/0085506 A1 4/2011 Lee et al.
(Continued)

FOREIGN PATENT DOCUMENTS

EP 3 018 956 A2 5/2016
KR 10-2017-0028733 A 3/2017

OTHER PUBLICATIONS

ILT Inc.; Considerations on simplified functionalities of PCFICH for low-cost MTC UEs; 3GPP TSG RAN WG1 Meeting #76; R1-140667; Feb. 10-14, 2014; Prague, Czech Republic.
(Continued)

*Primary Examiner* — Steven H Nguyen
(74) *Attorney, Agent, or Firm* — Jefferson IP Law, LLP

(57) ABSTRACT

An electronic device in a wireless communication may include a communication unit configured to receive a signal, and a control unit configured to perform decoding of a control channel of the signal according to a first decoding condition among decoding conditions determined based on system information candidates for system information and to determine whether decoding is successful for the first decoding condition according to a result of performing the decoding.

18 Claims, 9 Drawing Sheets

(56) References Cited

U.S. PATENT DOCUMENTS

| | | | |
|---|---|---|---|
| 2012/0051270 A1 | 3/2012 | Chen et al. | |
| 2013/0242882 A1* | 9/2013 | Blankenship | H04L 5/0041 370/329 |
| 2013/0283134 A1 | 10/2013 | Bai et al. | |
| 2014/0044027 A1* | 2/2014 | Beale | H04W 56/00 370/311 |
| 2014/0056244 A1* | 2/2014 | Frenne | H04W 72/1289 370/329 |
| 2014/0153516 A1* | 6/2014 | Young | H04W 48/12 370/329 |
| 2014/0198720 A1 | 7/2014 | Gaal et al. | |
| 2015/0365930 A1 | 12/2015 | Tabet et al. | |
| 2015/0373668 A1* | 12/2015 | Lee | H04L 5/0092 370/329 |
| 2016/0014748 A1 | 1/2016 | Kim et al. | |
| 2016/0182209 A1* | 6/2016 | Li | H04L 5/1469 370/329 |
| 2017/0026941 A1* | 1/2017 | Su | H04L 5/00 |
| 2017/0070980 A1 | 3/2017 | Eun et al. | |
| 2017/0180086 A1* | 6/2017 | Xiong | H04L 5/0053 |
| 2018/0027483 A1* | 1/2018 | You | H04W 48/12 370/336 |
| 2018/0248595 A1* | 8/2018 | Chae | H04B 7/0456 |

OTHER PUBLICATIONS

European Search Report dated Nov. 21, 2019; European Appln. No. 17874864.6-1220 / 3547578 PCT/KR2017013645.

\* cited by examiner

CONTROL CHANNEL DECODING DEVICE AND METHOD IN WIRELESS COMMUNICATION SYSTEM

TECHNICAL FIELD

The disclosure relates in general to a wireless communication system. In particular, the disclosure relates to an apparatus and method for performing decoding of a control channel in the wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In Orthogonal Frequency Division Multiplexing (OFDM) such as an LTE downlink system, decoding is performed for a control region included in a signal and thereafter decoding is performed for a data region. The control region includes a Master Information Block (MIB), a Control Format Indicator (CFI), and a Downlink Control Information (DCI), as control information for decoding the data region. As the decoding for the control region, Physical Broadcasting Cannel (PBCH) decoding for acquiring the MIB, Physical Control Format Indicator Channel (PCFICH) decoding for acquiring the CFI, and PDCCH decoding for acquiring the DCI are sequentially performed.

Meanwhile, although a code rate of the CFI or a code rate of the MIB is generally higher than a code rate of the DCI according to a sequential decoding order, in the opposite case, PBCH decoding or PCFICH decoding has effect on decoding performance of the entire control channel. Therefore, there is a need for a decoding scheme for solving this problem.

DISCLOSURE OF INVENTION

Technical Problem

The disclosure provides an apparatus and method for effectively performing decoding in a wireless communication system.

In addition, the disclosure provides an apparatus and method for decoding a control channel without information on a structure of a control channel in a wireless communication system.

In addition, the disclosure provides an apparatus and method for deciding a control channel without having to decode a Master Information Block (MIB) and a Control Format Indicator (CFI) in advance in a wireless communication system.

In addition, the disclosure provides an apparatus and method for configuring a decoding condition of a control channel on the basis of MIB candidates and CFI candidates in a wireless communication system.

In addition, the disclosure provides an apparatus and method for simplifying a range of decoding conditions of an available control channel according to a transmission antenna and bandwidth supported in a wireless communication system.

In addition, the disclosure provides an apparatus and method for decreasing a deterioration of decoding performance of the entire control channel according to an error of Physical Broadcasting Channel (PBCH) decoding or Physical Control Format Indicator Channel (PCFICH) decoding in a wireless communication system.

In addition, the disclosure provides an apparatus and method for robustly decoding a data region in a wireless communication system.

Solution to Problem

According to various embodiments of the disclosure, an electronic device in a wireless communication may include a communication unit configured to receive a signal, and a control unit configured to perform decoding of a control channel of the signal according to a first decoding condition among decoding conditions determined based on system information candidates for system information and to determine whether decoding is successful for the first decoding condition according to a result of performing the decoding.

According to various embodiments of the disclosure, a method of operating an electronic device in a wireless communication system may include receiving a signal, performing decoding of a control channel of the signal according to a first decoding condition among decoding conditions determined based on system information candidates for system information, and determining whether decoding is successful for the first decoding condition according to a result of performing the decoding.

According to various embodiments of the disclosure, an electronic device in a wireless communication system may include a communication unit configured to receive a signal from a base station, and a control unit configured to perform decoding of the control channel according to decoding conditions determined based on candidates for a structure of a control channel of the signal. The candidates for the structure of the control channel may be determined based on at least one of the number of antennas used to transmit the signal and channel allocation for Acknowledge (ACK)/Negative-Acknowledge (NACK) transmission.

Advantageous Effects of Invention

An apparatus and method according to various embodiments of the disclosure can improve decoding performance by repeatedly performing decoding on the basis of Master Information Block (MIB) candidates and Control Format Indicator (CFI) candidates.

Advantages acquired in the disclosure are not limited to the aforementioned advantages. Other advantages not mentioned herein can be clearly understood by those skilled in the art to which the disclosure pertains from the following descriptions.

BEST MODE FOR CARRYING OUT THE INVENTION

Figure 1:
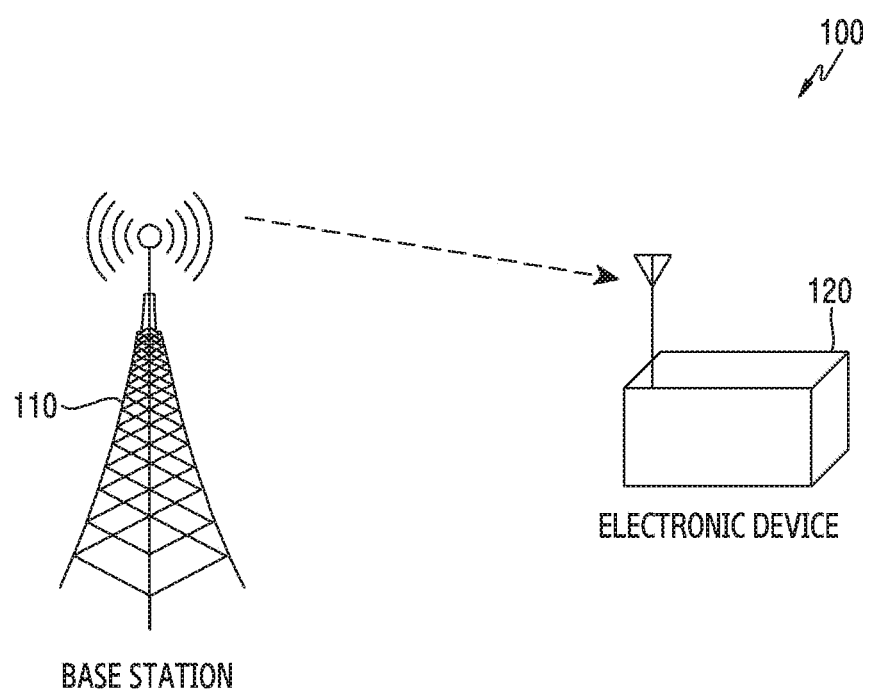
FIG. 1 illustrates a wireless network environment according to various embodiments of the disclosure.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based access method is described for example in the various embodiments of the disclosure described hereinafter. However, since the various embodiments of the disclosure include a technique in which hardware and software are both used, a software-based access method is not excluded in the embodiments of the disclosure.

Hereinafter, various embodiments of the disclosure are described with reference to the accompanying drawings. It should be appreciated that the embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression may include a plural expression unless there is a contextually distinctive difference.

In the disclosure, expressions such as "A or B", "at least one of A and/or B", or the like may include all possible combinations of items enumerated together. Expressions such as "1st" and "2nd" or "first" and "second" may be used to simply distinguish a corresponding component from another, and does not limit the component in other aspect (e.g., importance or order). When a certain (e.g., 1st) component is mentioned as being "operatively or communicatively coupled with/to" or "connected to" a different (e.g., 2nd) component, the certain component is directly coupled with/to another component or can be coupled with/to the different component via another (e.g., 3rd) component.

An expression "configured to" used in the disclosure may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

When decoding is performed for a control region of a signal to be received, due to sequential decoding operations, there is a problem in that performance of the entire system depends on performance of decoding (e.g., PBCH decoding, PCFICH decoding which is performed preferentially. Therefore, in the following disclosure, a decoding scheme of a control channel is described, which is not affected by decoding performance in a previous step by determining available MIB candidates and CFI candidates and by repeatedly performing decoding.

FIG. 1 illustrates a wireless network environment according to various embodiments of the disclosure.

Referring to FIG. 1, the wireless network environment may be a wireless network environment 100. The wireless network environment 100 may include a base station 110 and an electronic device 120.

In addition to the term "base station", according to a network type, the base station 110 may be referred to as an "Access Point (AP)", an "eNodeB (eNB)", or a "Transmission/Reception Point (TRP)". Hereinafter, for convenience, the base station 110 may be used to imply network infrastructure components which provide radio access to remote terminals in the disclosure.

In some embodiments, the electronic device 120 may be a terminal. The electronic device 120 may receive data from the base station 110, or may receive control information on the data. The control information may include information on downlink scheduling, a resource used in uplink transmission of the terminal, an uplink scheduling grant, and information on Hybrid Automatic repeat ReQuest (HARQ) ACKnowledgement (ACK). According to a network type, the electronic device 120 may be referred to as other well-known terms such as a "User Equipment (UE)", a "mobile station", a "subscriber station", a "remote terminal", a "wireless terminal", or a "user device".

In some other embodiments, the electronic device 120 may be a base station. For example, the electronic device 120 may be a base station which supports an Over The Air Receiver (OTAR) function. The electronic device 120 may be a base station which periodically measures a wireless environment by receiving a signal from neighboring base stations and receives control information related to resource allocation from the base station 110 for a Self-Organized Network (SON). The control information may include information on downlink scheduling. According to a network type, the electronic device 120 may be an independent base station such as the base station 110, or may be a base station (e.g., a femto base station, a pico base station, a small cell base station) which covers a smaller area than the base station 110.

The disclosure describes in detail a process in which the electronic device 120 decodes control information when the base station 110 transmits the control information to the electronic device 120. The control information may be downlink control information such as scheduling or power control commands. Hereinafter, although an LTE downlink system is described as an example in FIG. 2 to FIG. 9 for convenience of explanation, the disclosure is not limited thereto.

Figure 2:
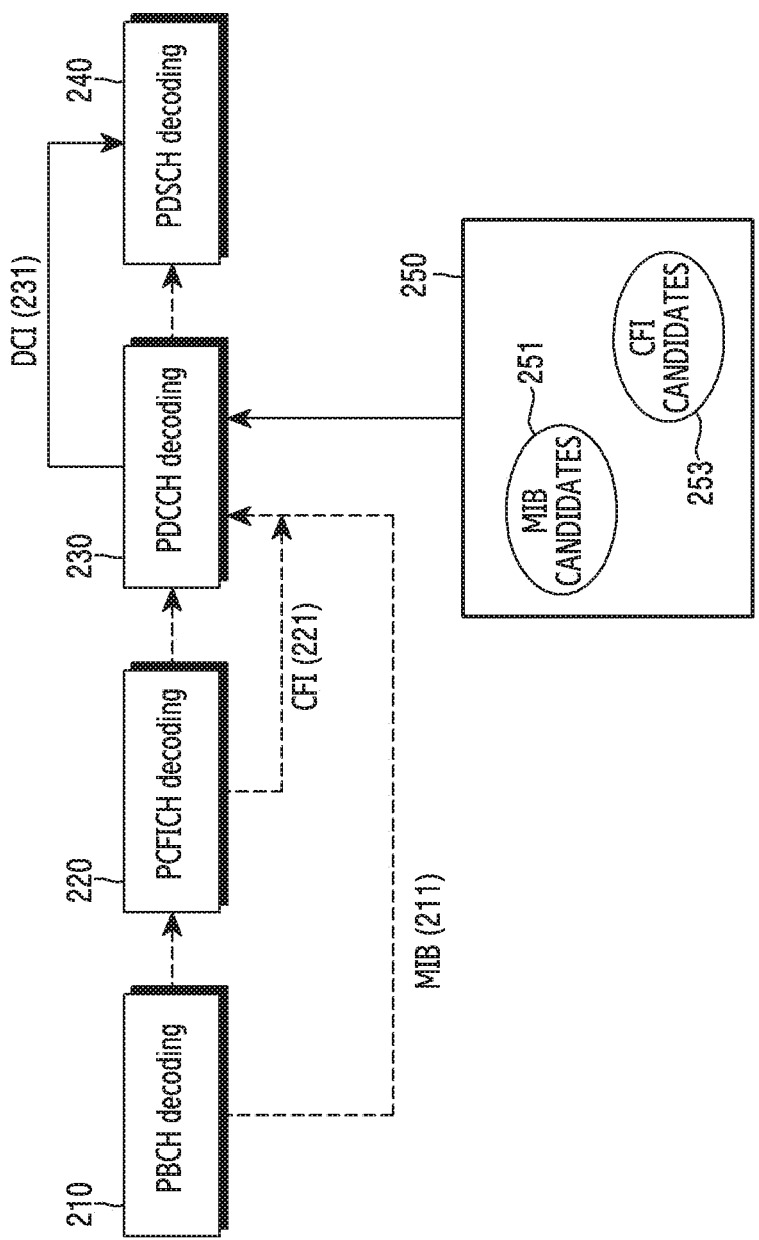
FIG. 2 illustrates an example of decoding of an electronic device according to various embodiments of the disclosure.

FIG. 2 illustrates an example of decoding of an electronic device according to various embodiments of the disclosure. The electronic device may be the electronic device 120 of FIG. 1. Hereinafter, terms required to explain various embodiments will be defined with reference to FIG. 2. Terms used hereinafter, i.e., a term (e.g., a control channel, a control region) referring to control information, a term (e.g., decoding, configuration) for a computation state, a term (e.g., a data region, a value) referring to data, a term referring to network entities, a term (e.g., a request, a frame, a subframe) referring to messages, a term referring to a component of a device, and the like are exemplified for convenience of explanation. Therefore, the disclosure is not limited to the terms described below, and other terms having the same technical meaning may also be used.

Referring to FIG. 2, in general, decoding of a control region for downlink data may include Physical Broadcasting Channel (PBCH) decoding 210, Physical Control Format Indicator Channel (PCFICH) decoding 220, and Physical Downlink Control Channel (PDCCH) decoding 230. If a Downlink Format Indicator (DCI) 231 is acquired according to a decoding result of the control region, Physical Downlink Shared Channel (PDSCH) decoding 240 may be performed based on the DCI 231. Specifically, a device which has received a subframe performs the PBCH decoding 210 to acquire a Master Information Block (MIB) 211 as system information. The device performs the PCFICH decoding 220 to acquire a Control Format Indicator (CFI) 221 indicating a control region of the subframe to be received. On the basis of the acquired MIC 211 and CFI 221, the device may perform PDCCH decoding to acquire the DCI 231. However, if an error occurs in the PBCH decoding 210 or the PCFICH decoding 220, whether the PDCCH decoding 230 is successful may be uncertain even if a code rate of the DCI 231 is low. In other words, irrespective of whether the PDCCH decoding is successful, an error occurs in the decoding of the entire control channel due to the error in the PBCH decoding 210 or the PCFICH decoding 220.

Therefore, the electronic device 120 according to various embodiments of the disclosure performs the PDCCH decoding 230 without having to perform the PBCH decoding 210 and the PCFICH decoding 220. In other words, the electronic device 120 according to various embodiments may not perform the PBCH decoding 210 or the PCFICH decoding 220, unlike a typical receiving device. That is, the electronic device 120 may perform the PDCCH decoding 230 instead of performing the PBCH decoding 210. Since the PBCH decoding 210 is not performed, the electronic device 120 cannot know content of an MIB to be acquired when the PBCH decoding 210 is performed. Therefore, the electronic device 120 may predict the content of the MIB, and may perform the PDCCH decoding 230 on the basis of the predicted content of the MIB. Herein, the MIB to be acquired according to a result of the PBCH decoding 210 includes a cell bandwidth, information on PHICH configuration of a cell, a System Frame Number (SFN), and information indicating the number of transmission antennas. Hereinafter, a set of MIBs that can be predicted to be acquired may be referred to as MIB candidates 251. The electronic device 120 may determine $N_{MIB}$ MIB candidates 251 on the basis of at least one of the number of available cell bandwidths, information on available PHICH configuration of a cell, and the number of available transmission antennas.

The electronic device 120 may perform the PDCCH decoding 230 instead of performing the PCFICH decoding 220. Since the PCFICH decoding 220 is not performed, the electronic device 120 cannot know content of a CFI to be acquired when the PCFICH decoding 220 is performed. Therefore, the electronic device 120 may predict the content of the CFI, and may perform the PDCCH decoding 230 on the basis of the predicted content of the CFI. Herein, the CFI to be acquired according to a result of the PCFICH decoding 220 indicates the number of symbols allocated for a control region, and may be one of 1, 2, and 3. Hereinafter, a set of CFIs that can be predicted to be acquired may be referred to as CFI candidates 253. In other words, the electronic device 120 may determine three CFI candidates 253.

The electronic device 120 may determine a plurality of decoding conditions 250 according to the $N_{MIB}$ MIB candidates 251 and three CFI candidates 253. The plurality of decoding conditions 250 may be a set of decoding conditions for the control channel. The electronic device 120 may select one of the plurality of decoding conditions 250 and repeatedly perform the PDCCH decoding 230. The electronic device 120 may change a decoding condition selected from the plurality of decoding conditions 250 and repeatedly perform the PDCCH decoding according to the changed decoding condition, until the DCI 231 is successfully acquired from the PDCCH decoding 230 through Cyclic Redundancy Check (CRC). The electronic device 120 may decrease an error risk of the PBCH decoding 210 or PCFICH decoding 220 by repeatedly performing the PDCCH decoding 230 while changing the decoding condition. As described above, since the electronic device 120 does not perform the PBCH decoding 210 or the PCFICH decoding 220, when a code rate of the MIB or a code rate of the CFI is relatively higher than a code rate of the DCI, there is an advantage in that a decoding success rate for the control channel can be improved.

When the DCI 231 is acquired upon success of the PDCCH decoding 230, the electronic device 120 may perform the PDCCH decoding 240 on the basis of the acquired DCI 231. The electronic device 120 may set a decoding condition selected when the DCI 231 is acquired, as a subframe parameter. The subframe parameter may indicate a transmission bandwidth of a corresponding subframe, the number of CFIs in the subframe, the number of antennas which have transmitted the subframe, and PHICH resource allocation in the subframe. The electronic device 120 may determine that the MIB to be acquired from the PBCH decoding and the CFI to be acquired from the PCFICH decoding 220 correspond to the set subframe parameter, even if the PBCH decoding 210 or the PCFICH decoding 220 is not performed.

The electronic device 120 may determine whether to transmit ACKnowledge (ACK) or Negative-ACKnowledge (NACK) according to a result of the PDSCH decoding 240. The electronic device 120 may determine whether the PDSCH decoding 240 has an error, that is, whether it is successful, through CRC. Upon success of the PDSCH decoding 240, the electronic device 120 may acquire data transmitted from the base station 110, and may transmit ACK according to a PHICH resource configuration of the set subframe parameter. Otherwise, upon failure of the PDSCH decoding 240, the electronic device 120 may transmit NACK according to the PHICH resource configuration of the set subframe parameter.

A procedure of decoding a PDCCH without PBCH and PCFICH decoding has been described with reference to FIG. 2. Herein, the PDCCH is an example of a control channel for transferring resource allocation information, and the PBCH and the PCFICH are an example of a different control channel for transferring configuration information for the control channel. Herein, the different control channel may be referred to as a 'control channel configuration channel', a 'primary control channel', or the like, and the control channel may be referred to as a 'resource allocation channel, a secondary control channel', or the like. Therefore, the aforementioned decoding procedure may be equally or similarly applied in the relation of the control channel and the different control channel indicating configuration for the control channel. Hereinafter, although an LTE system is described as an example for convenience of explanation, various embodiments described below may also be easily applied to a system conforming to another protocol.

Figure 3:
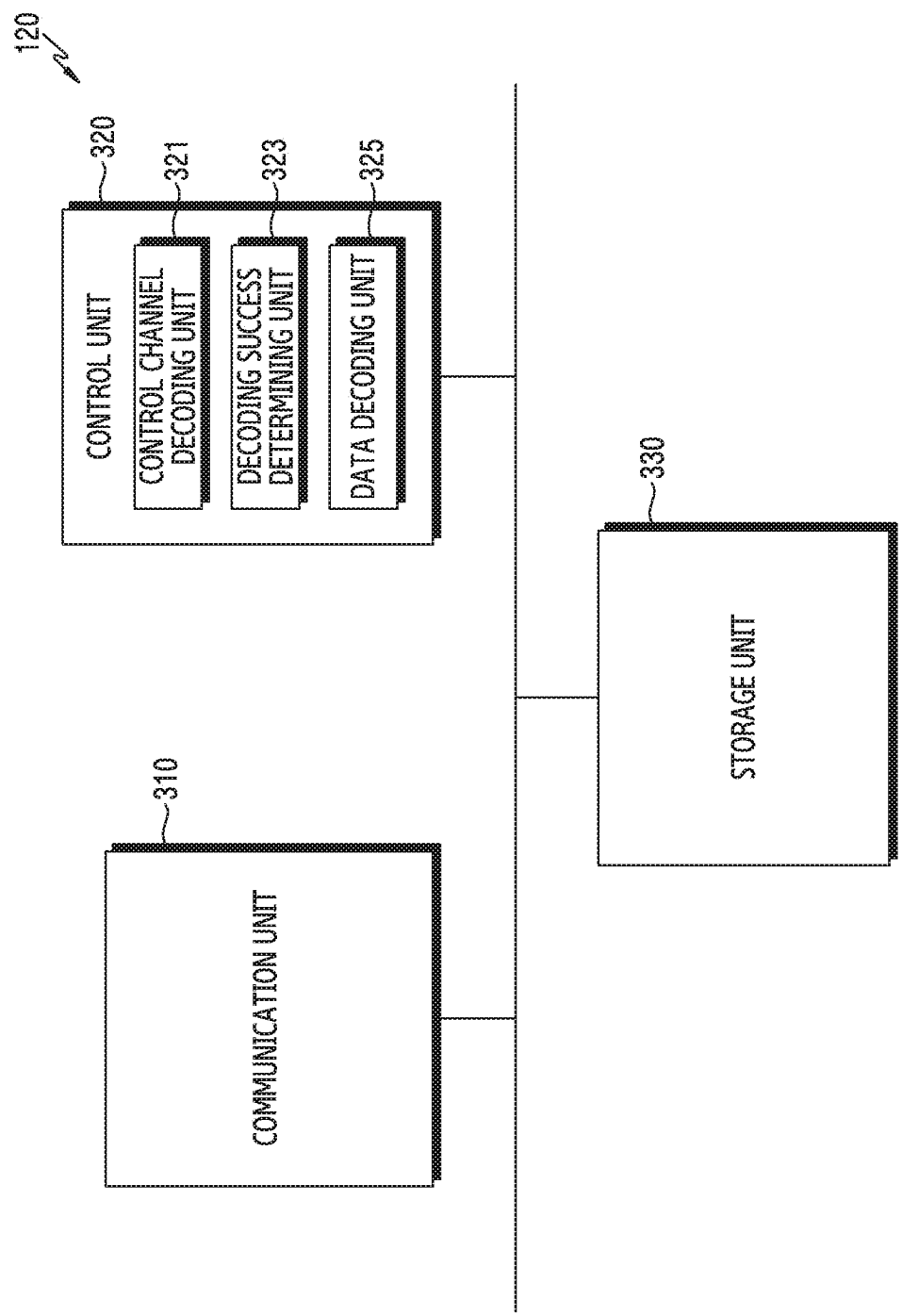
FIG. 3 illustrates a functional structure of an electronic device according to various embodiments of the disclosure.

FIG. 3 illustrates a functional structure of an electronic device according to various embodiments of the disclosure. The electronic device may be the electronic device 120 of FIG. 1. Hereinafter, the term ' . . . unit', ' . . . device', or the like implies a unit of processing at least one function or operation, and may be implemented in hardware or software or in combination of the hardware and the software.

Referring to FIG. 3, the electronic device 120 may include a communication unit 310, a control unit 320, and a storage unit 330.

The communication unit 310 may perform functions for transmitting/receiving a signal through a wireless channel. For example, the communication unit 310 may perform a function of conversion between a baseband signal and a bit-stream according to a physical layer standard of a system. For example, in data transmission, the communication unit 310 may generate complex symbols by coding and modulating a transmission bit-stream. In addition, in data reception, the communication unit 310 may restore a received bit-stream by demodulating and decoding a baseband signal. The communication unit 310 may up-convert a baseband signal into a Radio Frequency (RF) signal and thereafter transmit it through an antenna. The communication unit 310 may down-convert an RF signal received through the antenna into a baseband signal. For example, the communication unit 310 may include a transmission filter, a reception filter, an amplifier, a mixer, an oscillator, a Digital to Analog Converter (DAC), an Analog to Digital Converter (ADC), or the like. The communication unit 310 may include a plurality of RF chains if a plurality of antennas are provided.

The communication unit 310 may receive a signal from the base station 110 of FIG. 1. The communication unit 310 may receive the signal on a subframe basis. As soon as the signal is received, the communication unit 310 may transfer symbols included in the signal to the control unit 320 for successful decoding. One subframe may include at least one control symbol corresponding to a control region and data symbols corresponding to a data region. Since a control symbol is relatively preferentially transmitted for the control of data transmission, the communication unit 310 transmits the control symbol to the control unit 320, and sequentially transmits the symbols corresponding to the data region.

The communication unit 310 may request the base station 110 to allocate a resource in some embodiments in which the electronic device 120 is a base station. The base station may be a base station which supports an SON. The communication unit 310 may receive a plurality of signals through an OTAR function. The communication unit 310 may request the base station 110 to allocate a resource according to a wireless environment measured from the received signal.

The control unit 320 may include a control channel decoding unit 321, a decoding success determining unit 323, and a data decoding unit 325. The control unit 320 may control the control channel decoding unit 321, the decoding success determining unit 323, and the data decoding unit 325 in such a manner that, upon success of decoding for the control region, decoding for a data region is performed, and upon failure, decoding for the control region is repeatedly performed.

The control channel decoding unit 321 may perform decoding for a control region of a subframe received from the communication unit 310. According to an embodiment, the control channel decoding unit 321 may perform decoding of a PDCCH region without having to perform PBCH decoding and PCFICH decoding in advance. For this, the control channel decoding unit 321 may determine the plurality of decoding conditions. The plurality of decoding conditions are a set of decoding conditions for the control channel. The plurality of decoding conditions may include decoding conditions consisting of the number of possible cases since PBCH decoding and PCFICH decoding are not performed. In other words, the plurality of decoding conditions may be determined based on available MIBs and available CFIs. Specifically, the control channel decoding unit 321 may identify $N_{MIB}$ MIB candidates consisting of MIBs to be predicted, such as a bandwidth of a signal that can be received in the communication unit 310, the number of transmission antennas, and PHICH configuration information. In addition, the control channel decoding unit 321 may identify three CFI candidates as CFI values that can be received in the communication unit 310. The control channel decoding unit 321 may generate $N_{MIB} \times 3$ decoding conditions according to the MIB candidates and the CFI candidates.

In some embodiments, the control channel decoding unit 321 may decrease the number of MIB candidates predicted according to information on an accessed network. For example, the control channel decoding unit 321 may identify in advance a transmission bandwidth to be provided in practice to the electronic device 120 according to a network provider which supports a communication system of the electronic device 120. Since the bandwidth is identified, the control channel decoding unit 321 may decrease the number of MIB candidates by the number of cases of an available bandwidth. When the number of cases of the available transmission bandwidth is 6, if the number of available MIB candidates is 144, the control channel decoding unit 321 may determine 24 as the number of MIB candidates. Since the control channel decoding unit 321 decreases the number of MIB candidates, the number of times of repeating decoding can be decreased. Since the number of times of repeating decoding is decreased, power consumption of the electronic device 120 can be decreased.

The control channel decoding unit 321 may select one of the plurality of decoding conditions, and thus may perform decoding for the control channel. For example, the control channel decoding unit 321 may perform decoding for the control channel according to an $i^{th}$ decoding condition in which a bandwidth is 1.4 GHz, the number of transmission bandwidths is 2, a PHICH is allocated through a first symbol, a PHICH group scaling factor is 1, and a CFI value is 3. The control channel may be a PDCCH in a subframe.

The decoding success determining unit 323 may determine whether decoding for the control channel is successful, which is performed in the control channel decoding unit 321. The decoding success determining unit 323 may determine whether decoding of the control channel is successful through CRC. If a CRC result is matched, the decoding success determining unit 323 may determine that the decoding of the control channel is successful.

The decoding success determining unit 323 may determine whether to repeatedly perform decoding of the control channel according to a decoding result of the control channel. Upon failure of the decoding result of the control channel, the decoding success determining unit 323 may request the control channel decoding unit 321 to perform decoding by selecting a different condition other than a pre-selected condition among the plurality of decoding conditions. For example, the control channel decoding unit 321 may select a condition different from the $i^{th}$ decoding condition according to the request. The control channel decoding unit 321 may perform decoding of the control channel according to an $(i+1)^{th}$ decoding condition in which a bandwidth is 1.4 GHz, the number of transmission bandwidths is 2, a PHICH is allocated through a first symbol, a PHICH group scaling factor is 2, and a CFI value is 1.

In some embodiments, upon success of decoding for the PDCCH region, the decoding success determining unit 323 may determine that the PDCCH decoding operation will not be repeated. The decoding success determining unit 323 may acquire one DCI according to the result of successful decoding. Meanwhile, in some other embodiments, upon success of decoding for the PDCCH region, the decoding success determining unit 323 may request to repeatedly perform decoding by selecting a different condition other than a condition selected in advance from the plurality of decoding conditions. In other words, the control channel decoding unit 321 may repeatedly perform a PDCCH decoding operation for each of all of the plurality of decoding conditions. The decoding success determining unit 323 may determine whether decoding is successful for each of the PDCCH decoding operations performed repeatedly by the number of the plurality of decoding conditions. Optionally, the decoding success determining unit 323 may acquire two or more DCIs by repeating decoding operations.

Upon acquiring the DCI according to a result of PDCCH decoding, the decoding success determining unit 323 may transfer the acquired DCI to the data decoding unit 325. Specifically, the decoding success determining unit 323 may report the acquired DCI by using a control layer so as to be used in PDSCH decoding. The control layer may be a layer for controlling a PHY layer, in a Medium Access Control (MAC) layer of the control unit 320.

The data decoding unit 325 may perform decoding for the PDSCH region on the basis of the acquired DCI. Specifically, the data decoding unit 325 may determine the PDSCH region allocated through the reported DCI. The data decoding unit 325 may perform decoding for the PDSCH region indicated by the DCI. The data decoding unit 325 may acquire data transmitted by the base station 110 according to a decoding result for the PDSCH region. The data decoding unit 325 may control the communication unit 310 to transmit ACK to the base station 110. On the contrary, upon absence of acquired data or upon failure of decoding for the PDSCH region, the data decoding unit 325 may control the communication unit 310 to transmit NACK to the base station 110.

The storage unit 330 may store a plurality of decoding conditions. The plurality of decoding conditions may refer to a set of decoding conditions for a control channel. The storage unit 330 may store a plurality of decoding conditions determined based on a parameter that can be acquired in advance (e.g., a transmission bandwidth based on a network provider), a parameter (e.g., PHICH configuration information) that can be acquired from PBCH decoding, and CFI values that can be acquired from PCFICH decoding. In some embodiments, the storage unit 330 may index the plurality of decoding conditions. The storage unit 330 may transfer configuration information on one of the stored decoding conditions to the control unit 230 while continuously incrementing an index by 1 at the request of the control unit 230. In some other embodiments, the storage unit 330 may store the plurality of decoding conditions by dividing the decoding conditions according to parameters (e.g., a transmission bandwidth, a PHICH resource allocation duration). The storage unit 330 may transfer configuration information on one of the stored decoding conditions to the control unit 230 while changing one parameter value at the request of the control unit 230.

The storage unit 330 may store parameters for PDSCH decoding. For example, the storage unit 330 may store a DCI acquired when PDCCH decoding is successful. The storage unit 330 may store or output the acquired DCI at the request of the control unit 320. For another example, the storage unit 330 may store a decoding condition corresponding to a case where PDCCH decoding is successful. Specifically, the storage unit 330 may store at least one of transmission bandwidth information, PHICH configuration information, transmission antenna count information, and CFI value information, corresponding to a case where the PDCCH decoding is successful. Since the CFI value is capable of identifying a boundary between a control region and a data region in a subframe, the storage unit 330 may provide the CFI value to the control unit 230.

Figure 4:
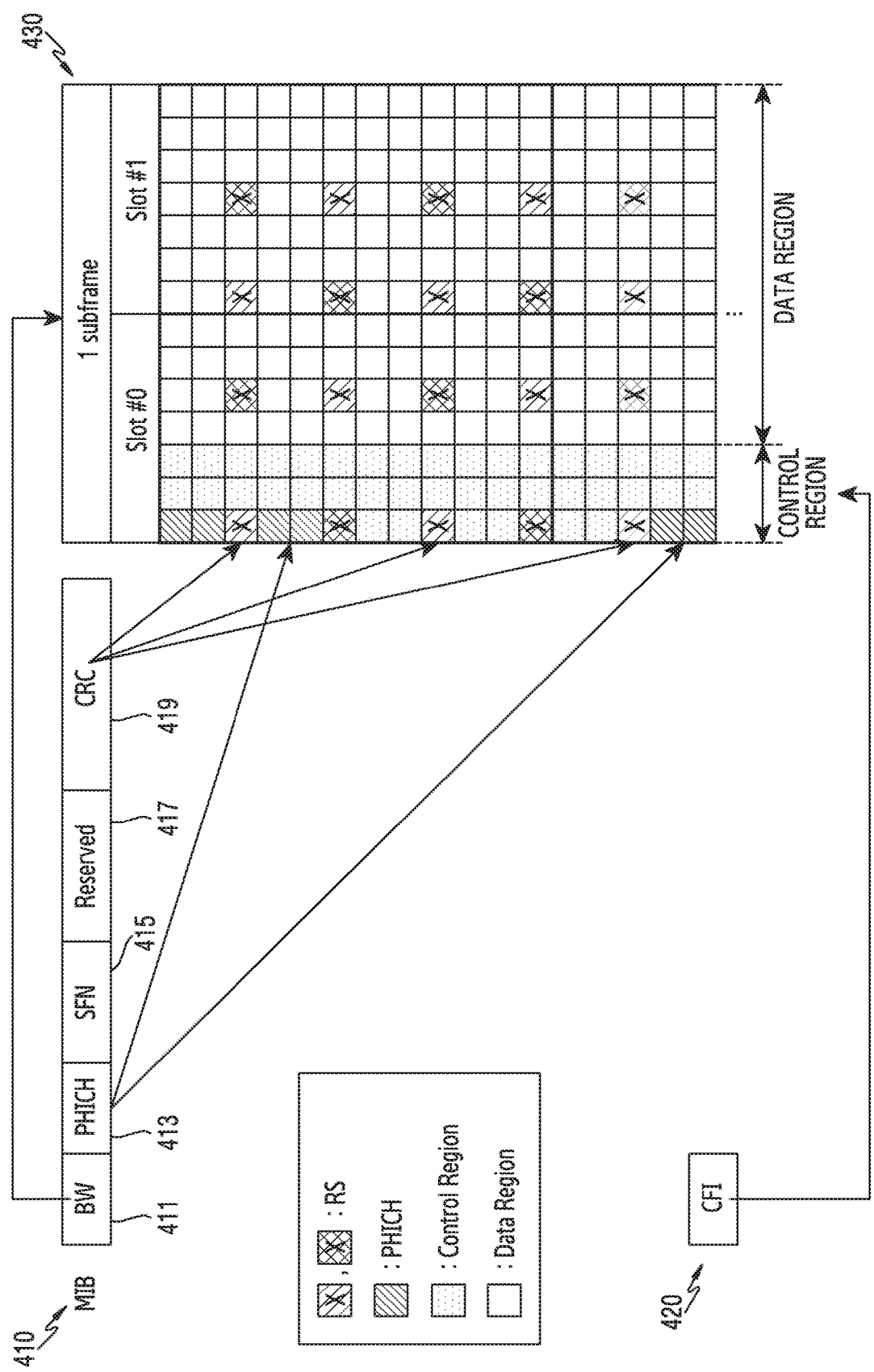
FIG. 4 illustrates an example of a resource configuration of a control channel on the basis of a Master Information Block (MIB) and a Control Format Indicator (CFI) according to various embodiments of the disclosure.

FIG. 4 illustrates an example of a resource configuration of a control channel on the basis of an MIB and a CFI according to various embodiments of the disclosure. The electronic device 120 according to various embodiments may determine a plurality of decoding conditions for the control channel on the basis of MIB candidates and CFI candidates as described above. Hereinafter, a configuration of each of the MIB candidate and CFI candidates included in the plurality of decoding conditions will be described in detail.

Referring to FIG. 4, a communication system (e.g., LTE) which supports the electronic device 120 may support transmission of an MIB 410 through a PBCH and transmission of a CFI 420 through a PCFICH. The MIB 410 includes system information which is essential for communication between a base station and a terminal. The MIB 410 may consist of 40 bits. The MIB 410 may consist of 24 bits for transferring system information and 16 bits 419 for controlling an error.

The system information may include information 411 indicating a transmission bandwidth. The information 411 indicating the transmission bandwidth may consist of 3 bits. The information 411 indicating the transmission bandwidth may indicate up to 8 different bandwidths. For example, the information 411 indicating the transmission bandwidth indicates one of 6 bandwidths (1.4 MHz, 3 MHz, 5 MHz, 10 MHz, 15 MHz, 20 MHz). That is, since the information 411 indicating the transmission bandwidth indicates a size of a frequency axis of a control region, the number of subcarriers for extracting the control region is set differently according to the information 411 indicating the transmission bandwidth. In other words, the electronic device 120 may set a size of a Fast Fourier Transform (FFT) operation differently according to the information 411 indicating the transmission bandwidth. Since PBCH decoding is not performed, the electronic device 120 cannot know the transmission bandwidth. Therefore, the electronic device 120 may repeatedly perform a decoding operation 6 times with a different transmission bandwidth.

The system information may include information 413 indicating a PHICH configuration. The PHICH configuration information 413 may include information on a duration in which a PHICH is allocated and information on a PHICH group scaling factor. The information on the duration may consist of 16 bits. The information on the duration indicates whether the PHICH is allocated to one symbol in one subframe or whether the PHICH is allocated to three symbols. That is, the information on the duration may indicate two different PHICH allocation durations. Information on the PHICH group scaling factor may consist of 2 bits. The information on the PHICH group scaling factor is quantized for different four cases, and indicates how many PHICH groups are supported by a transmission bandwidth. Herein, the PHICH group is defined as a set of a plurality of PHICHs generated through code multiplexing so as to be transmitted in a distributed manner to several resource elements. One PHICH group consists of 8 PHICHs in a normal Cyclic Prefix (CP) case and consists of 4 PHICHs in an extended CP case. The PHICH group scaling factor may be one of ⅙, ½, 1, and 2. For example, if the transmission bandwidth is 10 MHz and the PHICH group scaling factor is 2, then 6.25 PHICH groups may be included in 50 resource blocks according to a bandwidth of 10 MHz, and since 12 is obtained when it is multiplied by the scaling factor 2, the number of PHICH groups that can be supported is a roundup number thereof, i.e., 13. However, the electronic device 120 cannot know the PHICH configuration information 413 since PBCH decoding is not performed, and thus the electronic device 120 may repeatedly perform a decoding operation 8 (2×4) times in total with a different PHICH configuration.

In addition thereto, the system information may include the remaining 8 bits 415 except for two least significant bits of a system frame number, and reserved 10 bits 417.

The 16 bits 419 for the error control may be 16 bits for CRC. Since a masking pattern of the CRC has a different pattern according to the number of transmission antennas, the 16 bits for the CRC indicates the number of antennas used for signal transmission. The number and position of reference signals included in the control region vary depending on the number of antennas. Therefore, according to the masking pattern, the electronic device 120 may classify Resource Elements (REs) including control information other than the reference signal. Since the electronic device 120 does not perform PBCH decoding and thus cannot know the number of antennas in use, PDCCH decoding may be performed by assuming the number of available antennas. For example, if the number of available antennas is one of 1, 2, and 4, the electronic device 120 may repeatedly perform a PDCCH decoding operation 3 times.

The electronic device 120 may determine a plurality of MIB candidates according to the number of available bandwidths, an available PHICH configuration, and the number of available transmission antennas. For example, the electronic device 120 may determine 144 MIB candidates in total according to 6 bandwidth candidates, 8 PHICH configuration candidates, and 3 transmission antenna count candidates.

The CFI 420 indicates a range of a control region in a corresponding subframe. For example, if the CFI 420 is 3, it may indicate that three symbols among symbols included in the subframe correspond to the control region. The CFI 420 may consist of 2 bits. The CFI 420 may indicate one of 1, 2, and 3. Since the CFI 420 indicates the number of symbols of the control region, the electronic device 120 may set the number of symbols to be processed in order to acquire control information according to the CFI 420. However, since the electronic device 120 does not perform PCFICH decoding, PDCCH decoding may be repeatedly performed by assuming all of a case where the CFI value is 1, a case where the CFI value is 2, and a case where the CFI value is 3. That is, the electronic device 120 may determine three CFI candidates.

The electronic device 120 may determine a plurality of decoding conditions according to MIB candidates and CFI candidates. That is, the decoding conditions imply candidates of information for a PDCCH structure, as combinations of the MIB candidates and the CFI candidates. The electronic device 120 may perform decoding for a different PDCCH region according to each of the plurality of decoding conditions. In other words, since each of the plurality of decoding conditions provides a different PDCCH region in a subframe, for correct PDCCH decoding, decoding is required for each of the plurality of decoding conditions. Specifically, the different PDCCH region implies different resource allocation in a resource block.

The electronic device 120 may perform decoding for a corresponding PDCCH region in a subframe 430 by selecting one of the plurality of decoding conditions. The PDCCH region may vary according to the information 411 indicating a transmission bandwidth, the PHICH configuration information 413, the 16 bits 419 for error control, and what is indicated by the CFI 420.

The PDCCH region may include a different number of subcarriers on a frequency axis according to the information 411 indicating the transmission bandwidth. For example, if the transmission bandwidth indicates 15 MHz, 75 resource blocks, i.e., 900 subcarriers, may be included. If the transmission bandwidth indicates 1.4 MHz, 6 resource blocks, i.e., 72 subcarriers, may be included. Therefore, a frequency band of the PDCCH region may vary according to the information 411 indicating the transmission bandwidth.

The PDCCH region may be mapped according to the PHICH configuration information 413, the 16 bits 419 for error control, and what is indicated by the CFI 420. In the subframe 430, Resource Element Groups (REGs) remaining after PCFICH mapping and PHICH mapping are used for a PDCCH in a system. Therefore, when the PDCCH decoding is performed, the electronic device 120 is required to consider a resource region of the PDCCH allocated differently for each decoding condition.

Specifically, the subframe 430 is divided into a control region and a data region according to the information 411 indicating the transmission bandwidth and what is indicated by the CFI 420. For example, if the transmission bandwidth is 1.4 MHz and the CFI 420 is 2, it may indicate that $2^{nd}$ and $3^{rd}$ symbols in the subframe 430 are the control region. For another example, if the transmission bandwidth is 10 MHz and the CFI 420 is 3, it may indicate that the $1^{st}$ to $3^{rd}$ symbols are the control region. The electronic device 120 may perform PDCCH decoding in the divided control region.

The subframe 430 may determine the number of symbols in which the PHICH is used and the number of resource element groups in which a PHICH group is used, in the divided control region according to the PHICH configuration information 431. The electronic device 120 may perform PDCCH decoding in addition to a resource allocated to the PHICH or the PHICH group.

The subframe 430 may include Reference Signals (RSs) according to the number of transmission antennas indicated by the 16 bits 419 for error control. The RS may be an RS for channel estimation or for acquiring channel station information. The number of RSs transmitted when the number of transmission antennas is 4 may be four times greater than the number of RSs transmitted when the number of transmission antennas is 1. For example, if the number of transmission antennas is 4, RSs corresponding to $3^{rd}$ and $4^{th}$ antenna ports to be added may be multiplexed in a $2^{nd}$ OFDM symbol of each of slots in a subframe. Therefore, the number of symbols of an RS allocated to a control region may be increased according to an increase in the number of transmission antennas, and the electronic device 120 may perform PDCCH decoding in a resource other than a resource to which the symbols of the RS is allocated.

Figure 5:
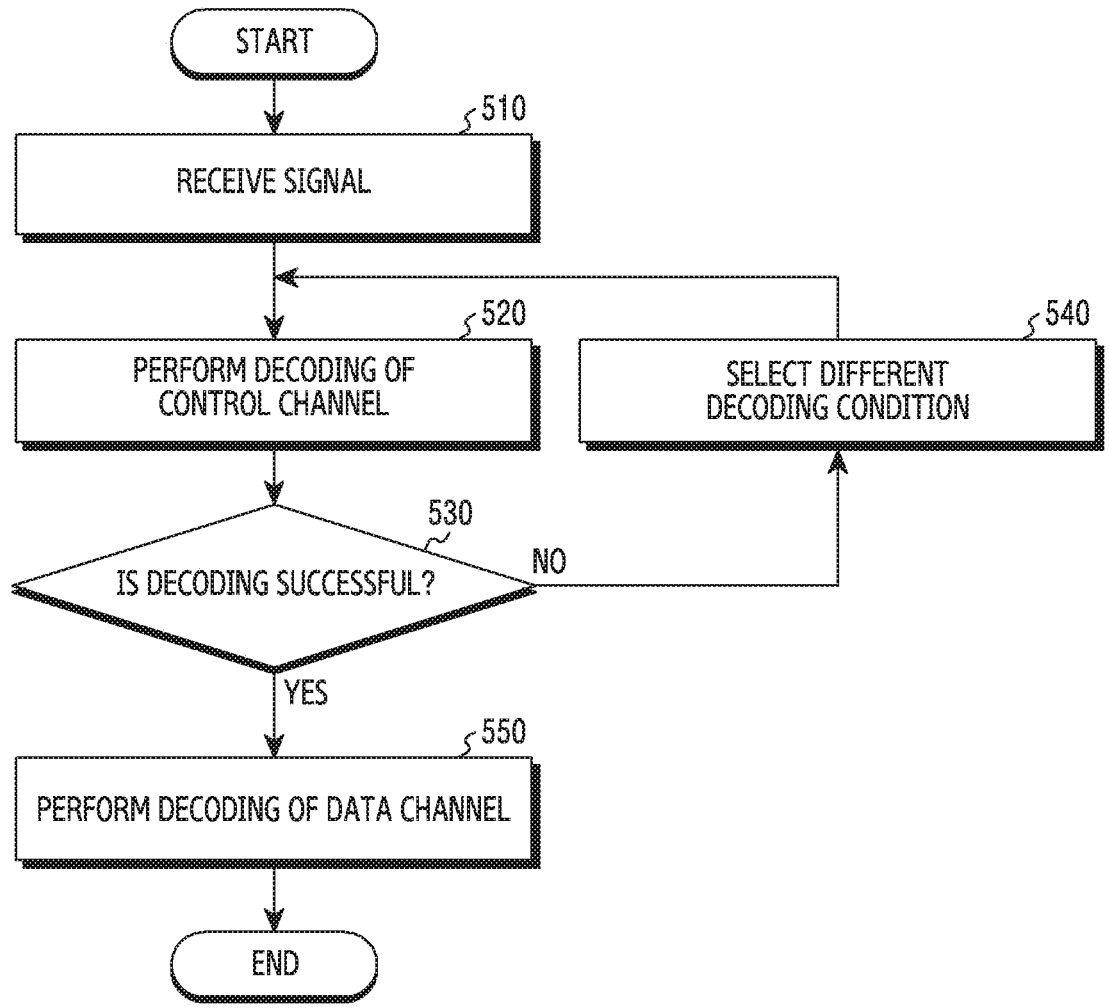
FIG. 5 is a flowchart illustrating a decoding operation of an electronic device according to various embodiments of the disclosure.

FIG. 5 is a flowchart illustrating a decoding operation of an electronic device according to various embodiments of the disclosure. The electronic device may be the electronic device 120 of FIG. 1.

Referring to FIG. 5, in step 510, the electronic device 120 may receive a signal from a base station (e.g., the base station 110 of FIG. 1). In some embodiments, the signal may include system information, control information, and data. The system information may include an MIB transferred through a PBCH. The electronic device 120 may receive 4 multiplexed MIBs throughout 40 ms. The control information may include a CFI transferred through a PCFICH and a DCI transferred through a PDCCH. The electronic device 120 may receive a corresponding CFI and DCI in each subframe. The data may be data transferred through a PDSCH. In some other embodiments, the system information may be system information transmitted through a PBCH. The system information may indicate a control region (e.g., a COntrol REsource SET (CORESET)) in which the signal is transmitted. The signal may be different system information.

In some embodiments, the electronic device 120 may perform the decoding for a signal to be received, immediately after a cell search process performed in initial access to a system in a power-on state. That is, a situation where the system information is not yet received may be assumed. The electronic device 120 may perform the decoding after finding a synchronization with the cell.

In step 520, the electronic device 120 may perform decoding of a control channel. In this case, according to various embodiments, although the system information and the control information are received, the electronic device 120 may not perform a decoding operation for acquiring an MIB of the system information and a CFI of the control information in order to improve PDCCH decoding performance. The electronic device 120 may perform the decoding of the control channel by selecting one of a plurality of decoding conditions determined based on available CFI candidates and MIB candidates. In addition, when operating repeatedly according to step 540, the electronic device 120 may perform the decoding of the control channel according to a decoding condition selected in step 540. Each decoding condition may represent a structure of a different control channel.

First, the electronic device 120 may determine a plurality of decoding conditions on the basis of available MIB candidates and available CFI candidates. The MIB candidates are determined based on transmission bandwidth candidates that can transmit a signal in step 510, PHICH configuration candidates that can be configured in response to the signal, and antenna count candidates that can transmit the signal. The CFI candidates include 1 to 3. For example, the electronic device 120 may determine up to 432 decoding conditions according to six bandwidth candidates (e.g., 1.4 MHz, 3 MHz, 5 MHz, 10 MHz, 15 MHz, 20 MHz), two PHICH duration information candidates (e.g., one symbol or three symbols), four PHICH group number candidates (e.g., ⅙, ½, 1, 2), three transmission antenna count candidates (e.g., 1, 2, 4), and three CFI candidates (e.g., 1, 2, 3).

In addition, in various embodiments, the electronic device 120 may determine a decoding condition on the basis of system information candidates. For example, the system information candidates may include available bandwidths in a control region in which the signal is transmitted. For another example, in the system information candidates, parameters indicating a time-frequency domain for the signal may include respective available values.

The electronic device 120 may perform decoding of a control channel by selecting one of the plurality of decoding conditions. The control channel may be a downlink control channel such as a PDCCH. For example, if the plurality of decoding conditions indicate that a bandwidth is 5 MHz, one PHICH symbol exists, a PHICH group scaling factor is 1, the number of antennas is 4, a CFI is 3, then in a control region indicated by the CFI of 3 and the bandwidth of 5 MHz, the electronic device 120 may perform PDCCH decoding for a portion other than a PCFICH symbol, a PHICH resource region determined according to the PHICH group scaling factor, and a resource region of a reference symbol which is added when the number of antennas is 4.

In step 530, the electronic device 120 may determine whether decoding is successful for the selected decoding condition according to a result of performing the decoding. Specifically, the electronic device 120 may perform CRC by using at least one Radio Network Temporary Identifier (RNTI). Each of the at least one RNTI may be an identifier of a different type according to a purpose such as unicast transmission, a power control command, a random access response, or the like. If a CRC value derived by performing the CRC is not matched (e.g., the remaining value is not 0), it may be determined that the decoding for the selected condition has failed. After performing step 540, the electronic device 120 may repeat steps 520 and 530. Otherwise, if the electronic device 120 determines that there is no error according to a result of performing the CRC, it may be determined that the decoding for the selected condition is successful. The electronic device 120 may perform step 550.

In step 540, upon failure of the decoding for the selected decoding condition, the electronic device 120 may select another decoding condition among the decoding conditions. The electronic device 120 may perform step 530 by changing at least one configuration among the decoding conditions. For example, when the electronic device 120 has performed PDCCH decoding by configuring a PHICH allocation duration to 1 symbol, the electronic device 120 may select a decoding condition in which the PHICH allocation duration is changed to 3 in a previous configuration.

In some embodiments, the electronic device 120 may select a different decoding condition according to a pre-set configuration among a plurality of parameters (e.g., a transmission bandwidth, the number of transmission antennas, a PHICH duration, a PHICH group scaling factor, a CFI) constituting the decoding condition. For example, if a priority for the CFI is higher than a priority for the number of transmission antennas, the electronic device 120 may preferentially select a decoding condition in which a configuration for the CFI is adjusted compared to a configuration for the number of transmission antenna. In addition, the electronic device 120 may determine an index for a configuration order of each of the plurality of decoding conditions according to the priority.

In step 550, upon success of the decoding for the selected decoding condition, the electronic device 120 may perform decoding of a data channel (e.g., PDSCH) by using control information (e.g., DCI) acquired through decoding of a control channel. The electronic device 120 may store the selected decoding condition. For example, if a CFI value of the selected decoding condition is 2, the electronic device 120 may store the CFI value as 2. If a control region is excluded in one subframe, the control region corresponds to a data region. Therefore, the electronic device 120 may perform PDSCH decoding for a data region other than a control region corresponding to 2 symbols in the subframe.

In the embodiment described with reference to FIG. 5, the electronic device 120 repeatedly performs decoding by changing the decoding conditions. In this case, according to another embodiment, the electronic device 120 may store an acquired DCI. The DCI may include information on a resource block to be allocated. If data is transferred through a DL-SCH, the electronic device 120 may perform PDSCH decoding by using the stored DCI.

In addition, in the embodiment described with reference to FIG. 5, the electronic device 120 attempts the decoding of the control channel according to the plurality of decoding conditions determined based on available CFI candidates and MIB candidates. In this case, according to another embodiment, the electronic device 120 may decrease the number of decoding conditions by using the number of transmission antennas and bandwidth information determined from a network operator. Accordingly, the electronic device 120 may identify information on an accessed network, and may exclude some of decoding conditions on the basis of the identified information. For example, the electronic device 120 may identify the information on the network through a Subscriber Identification Module (SIM), or may identify the information on the network according to an input from a user, or may identify the information on the network from information recorded when the electronic device 120 is manufactured.

In addition, in the embodiment described with reference to FIG. 5, when decoding is performed based on each of the decoding conditions, the electronic device 120 considers various formats for control information. That is, the control channel may transfer a plurality of control information messages, and the messages have different features according to the formats. For example, the messages may have different code rates. Accordingly, in other embodiments, the electronic device may perform decoding only for a format of control information having a lower code rate than a code rate applied to the MIB and the CFI.

In addition, when a DCI is acquired in FIG. 5, the electronic device 120 may no longer perform PDCCH decoding for a decoding condition which is not attempted. The electronic device 120 may minimize a time consumed in PDCCH decoding by decreasing an unnecessary decoding operation. Meanwhile, the electronic device 120 may perform PDCCH decoding for all decoding conditions in order to derive a more accurate decoding result. Hereinafter, an embodiment of decreasing an error rate by performing decoding for all decoding conditions will be described with reference to FIG. 6.

Figure 6:
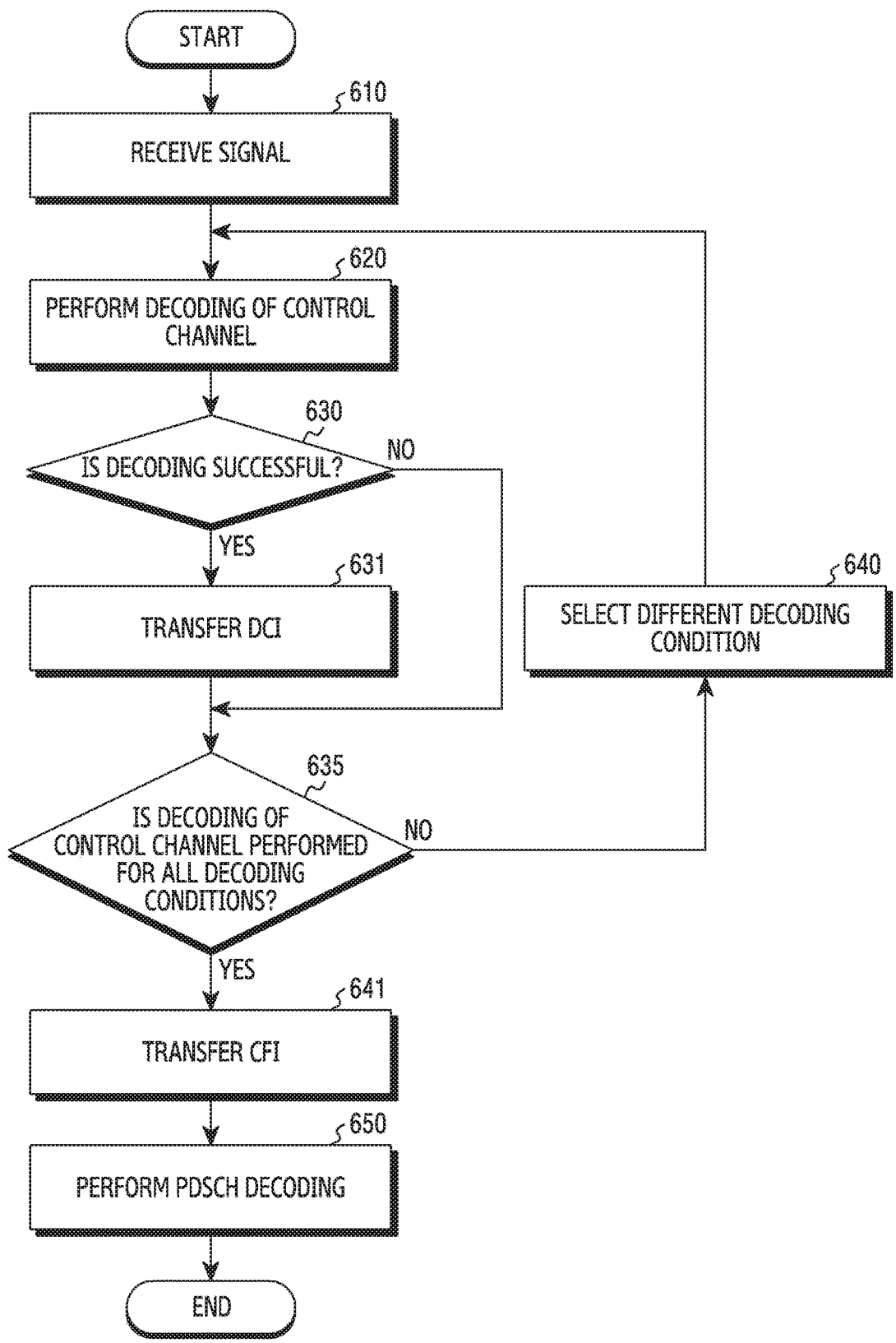
FIG. 6 is a flowchart illustrating a different decoding operation of an electronic device according to various embodiments of the disclosure.

FIG. 6 is a flowchart illustrating a different decoding operation of an electronic device according to various embodiments of the disclosure. The electronic device may be the electronic device 120 of FIG. 1.

Referring to FIG. 6, in step 610, the electronic device 120 may receive a signal from the base station 110. In step 620, the electronic device 120 may perform decoding of a control channel. Since the steps 610 and 620 correspond to the steps 510 and 520 of FIG. 5, descriptions of the steps 510 and 520 may also be equally or similarly applied to the steps 610 and 620, respectively.

In step 630, the electronic device 120 may determine whether decoding for a selected decoding condition is successful, according to a result of performing the decoding of the control channel. Upon determining success of the decoding, the electronic device 120 may perform step 631. Otherwise, upon determining failure of the decoding, the electronic device 120 may perform step 635 without having to perform step 631.

In step 631, the electronic device 120 may transfer an acquired DCI. The electronic device 120 may acquire the DCI according to a result of successful decoding of the control channel (e.g., PDCCH). The electronic device 120 may control a control layer in a MAC layer so that PDSCH decoding is performed through the acquired DCI. The electronic device 120 may transfer the DCI to a construction which performs the PDSCH decoding.

In step 635, the electronic device 120 may determine whether decoding has been performed for all of the determined plurality of decoding conditions. For example, the electronic device 120 may determine whether an index of a currently selected decoding condition is an index corresponding to a last index among all indices. The electronic device 120 may perform step 640 if there is a decoding condition which is not selected when PDCCH decoding is performed. The electronic device 120 may perform step 641 when PDCCH decoding is performed for each of all of the plurality of decoding conditions.

In step 640, the electronic device 120 may select a different decoding condition. That is, the electronic device 120 may select a new decoding condition by changing part of a configuration of a previous decoding condition. When conforming to the embodiment of FIG. 6, since PDCCH decoding is performed for all of the plurality of decoding conditions, the electronic device 120 may select a decoding condition which is not randomly selected, irrespective of a special order. For example, the electronic device 120 may select an $(i+1)^{th}$ decoding condition when an $i^{th}$ decoding condition is selected. Thereafter, the electronic device 120 may repeat steps 620 to 635.

In step 641, the electronic device 120 may transfer a CFI. The electronic device 120 may determine the CFI on the basis of a condition of successful decoding. The electronic device 120 may transfer the determined CFI to a construction (e.g., a decoding operation unit) which performs PDSCH decoding. Since a region remaining after excluding a region indicated by the CFI corresponds to a data region, the electronic device 120 may transfer the CFI to determine a PDSCH region.

In step 650, the electronic device 120 may perform PDSCH decoding. Although the electronic device 120 acquires one DCI value in general, the electronic device 120 may acquire two or more DCI values by repeatedly performing PDCCH decoding for each of the plurality of decoding conditions. That is, there may be two or more decoding configuration conditions which are determined as successful decoding according to a result of CRC. In this case, the electronic device 120 may perform PDSCH decoding by selecting one of the two or more DCI values. In some embodiments, the electronic device 120 may select one DCI on the basis of reliability for each of the two or more DCI values. The reliability for each of the two or more DCI values may be calculated according to likelihood metric or Soft Correlation Metric (SCM).

The electronic device 120 may identify a PDSCH region by using a CFI and a DCI. If two or more DCIs are acquired, the electronic device 120 may identify the PDSCH region by using a selected DCI and a CFI corresponding thereto. The electronic device 120 may acquire data transmitted by the base station 110 by performing decoding for the identified PDSCH region. In this case, the electronic device 120 may transmit ACK to the base station 110. On the contrary, if the data cannot be acquired due to failure of decoding for the identified PDSCH region or if the decoding is successful but there is no transmitted data, the electronic device 120 may transmit NACK to the base station 110.

Operations for performing decoding repeatedly through the selected decoding condition are described in FIG. 5 and FIG. 6. Hereinafter, a method of configuring a decoding condition set, i.e., a plurality of decoding conditions, will be described in detail with reference to FIG. 7.

Figure 7:
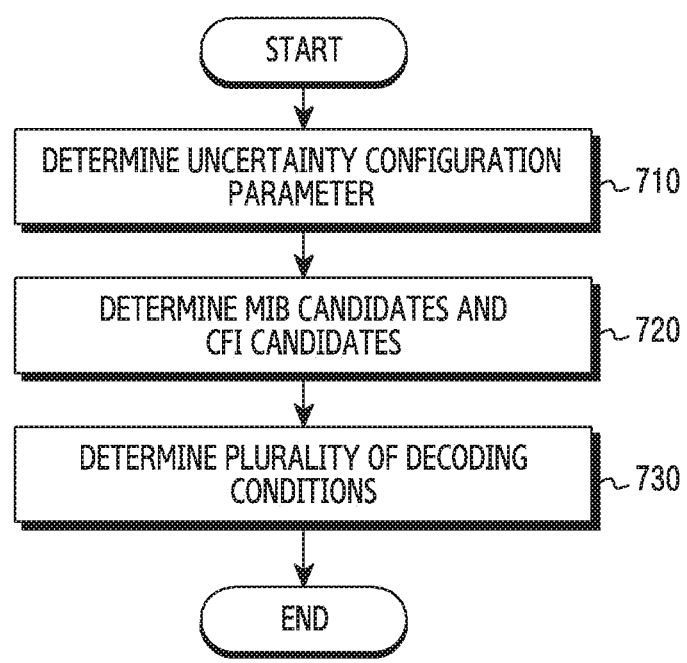
FIG. 7 is a flowchart illustrating a configuration of decoding conditions according to various embodiments of the disclosure.

FIG. 7 is a flowchart illustrating a configuration of decoding conditions according to various embodiments of the disclosure. The decoding condition is a condition for a control channel, that is, PDCCH decoding. Hereinafter, although it is described that the configuration of the decoding conditions is determined by the electronic device 120 of FIG. 1, the disclosure is not limited thereto. Therefore, the decoding conditions may be configured from any external device, or may be configured by the base station 110 and thereafter transferred to the electronic device 120 through a downlink or X2 interface.

Referring to FIG. 7, in step 710, the electronic device 120 may determine an uncertainty configuration parameter. The uncertainty configuration parameter is defined as a parameter other than a configuration parameter capable of knowing a value of either a CFI or parameters indicated from an MIB. That is, the uncertainty configuration parameter may be at least one of the CFI and the parameters indicated from the MIB. The parameters indicated from the MIB may be a transmission bandwidth of symbols to be received, the number of symbols in a subframe for PHICH resource allocation, the number of PHICH groups used in the PHICH resource allocation, and the number of transmission antennas for transmitting the symbols.

The electronic device 120 may determine whether there is a parameter (in other words, a certainty configuration parameter) that can be acquired without having to perform PBCH decoding among the parameters indicated from the MIB. In some embodiments, the electronic device 120 may acquire a transmission bandwidth which is provided either by default or when performing cell search and synchronization. For example, upon performing the cell search, the electronic device 120 may acquire information on a network operator of a base station which supports the electronic device 120 in a corresponding cell. The electronic device 120 may acquire the transmission bandwidth from the information on the network operator. For another example, the electronic device 120 may include the transmission bandwidth as imbedded information. If the electronic device 120 is a terminal which supports only an operator of a limited network or a terminal (e.g., a single SIM terminal) which supports only a specific bandwidth, information on a transmission bandwidth of a signal to be received may be acquired in advance. For another example, the electronic device 120 may acquire a transmission bandwidth for a network operator of the base station 110 by using any path when a subscription procedure or a network authentication procedure is performed.

In some other embodiments, the electronic device 120 may acquire the number of transmission antennas in advance. The electronic device 120 may acquire information on the number of transmission antennas through a communication scheme of a corresponding network operator upon acquiring information on the network operator. Although it has been described in the disclosure that the number of transmission antennas is one of 1, 2, and 4, the number of transmission antennas may be determined variously according to a communication technique and a policy of the network operator.

In addition to the aforementioned embodiments, the electronic device 120 may acquire at least one of a CFI and parameters indicated from an MIB through a separate path. For example, since the parameters indicated from the MIB are transmitted by being multiplexed using four frames and the CFI value is transmitted using a subframe, the electronic device 120 may pre-store and use information on MIB related parameters (e.g., a transmission bandwidth) corresponding to a case where PDCCH decoding is successful. That is, the electronic device 120 may acquire the stored MIB related parameters in a subsequent subframe.

The electronic device 120 may determine different parameters other than a parameter which can be acquired without having to perform PBCH decoding, as the uncertainly configuration parameters. For example, upon acquiring information on the transmission bandwidth and the number of transmission antennas without having to perform PBCH decoding, the electronic device 120 may determine the number of symbols in a subframe for PHICH resource allocation, the number of PHICH groups used in the PHICH resource allocation, and a CFI as the uncertainty configuration parameters.

In step 720, the electronic device 120 may determine MIB candidates and CFI candidates. The electronic device 120 may determine the MIB candidates and the CFI candidates on the basis of the uncertainty configuration parameters determined in step 710.

In some embodiments, the electronic device 120 may determine each of the MIB candidates by independently identifying the number of cases of each of the uncertainty configuration parameters. For example, if information on the transmission bandwidth and the number of transmission antennas is acquired without having to perform PBCH decoding, the electronic device 120 may determine 8 MIB candidates according to the number of cases (i.e., 2 cases) as the number of symbols in a subframe for PHICH resource allocation and the number of cases (i.e., 4 cases) as the number of PHICH groups used in the PHICH resource allocation.

In some other embodiments, the electronic device 120 may determine MIB candidates and CFI candidates by limiting at least one of the uncertainly configuration parameters. For example, if it is acquired that the transmission bandwidth exceeds a bandwidth of 10 MHz and the number of symbols for PHICH resource allocation is 3 without having to perform PBCH decoding, since the PHICH has already occupy three symbols, the electronic device 120 may determine 3 as the CFI value. For another example, if it is acquired that the number of symbols for the PHICH resource allocation is 3 but the acquired transmission bandwidth is less than or equal to the bandwidth of 10 MHz and thus a size of a control region corresponds to four symbols, the electronic device 120 may determine 2 or 3 as the CFI candidates to identify whether the size of the control region is 2 symbols or 3 symbols. For another example, if information on the transmission bandwidth is not acquired but only information indicating that the number of symbols for PHICH resource allocation is 3 is acquired, the electronic device 120 may determine both 2 and 3 as the CFI candidates. In the aforementioned embodiments, since information on PHICH resource allocation has already exceeded one symbol, a case where the CFI value is 1 is not considered.

In step 730, the electronic device 120 may determine a plurality of decoding conditions. The plurality of decoding conditions may be conditions for decoding of a control channel, i.e., a PDCCH, in the control region. The electronic device 120 may determine the plurality of decoding conditions on the basis of the determined MIB candidates and CFI candidates. For example, if there are 8 MIB candidates and 3 CFI candidates, these candidates may be independently identified, and thus the electronic device 120 may determine 24 decoding conditions. Parameters which have already been acquired are equally included for each of the decoding conditions.

In some embodiments, the electronic device 120 may store the plurality of decoding conditions as one variable, i.e., an index. Therefore, each of the plurality of decoding conditions may have a different configuration according to an index to be referred. In some other embodiments, the electronic device 120 may store the plurality of decoding conditions as a variable of each configuration parameter. When a real value for at least one configuration parameter is acquired during a repetitive decoding operation, the electronic device 120 may rapidly decrease the number of times of repeating PDCCH decoding by fixing a corresponding variable.

Figure 8:
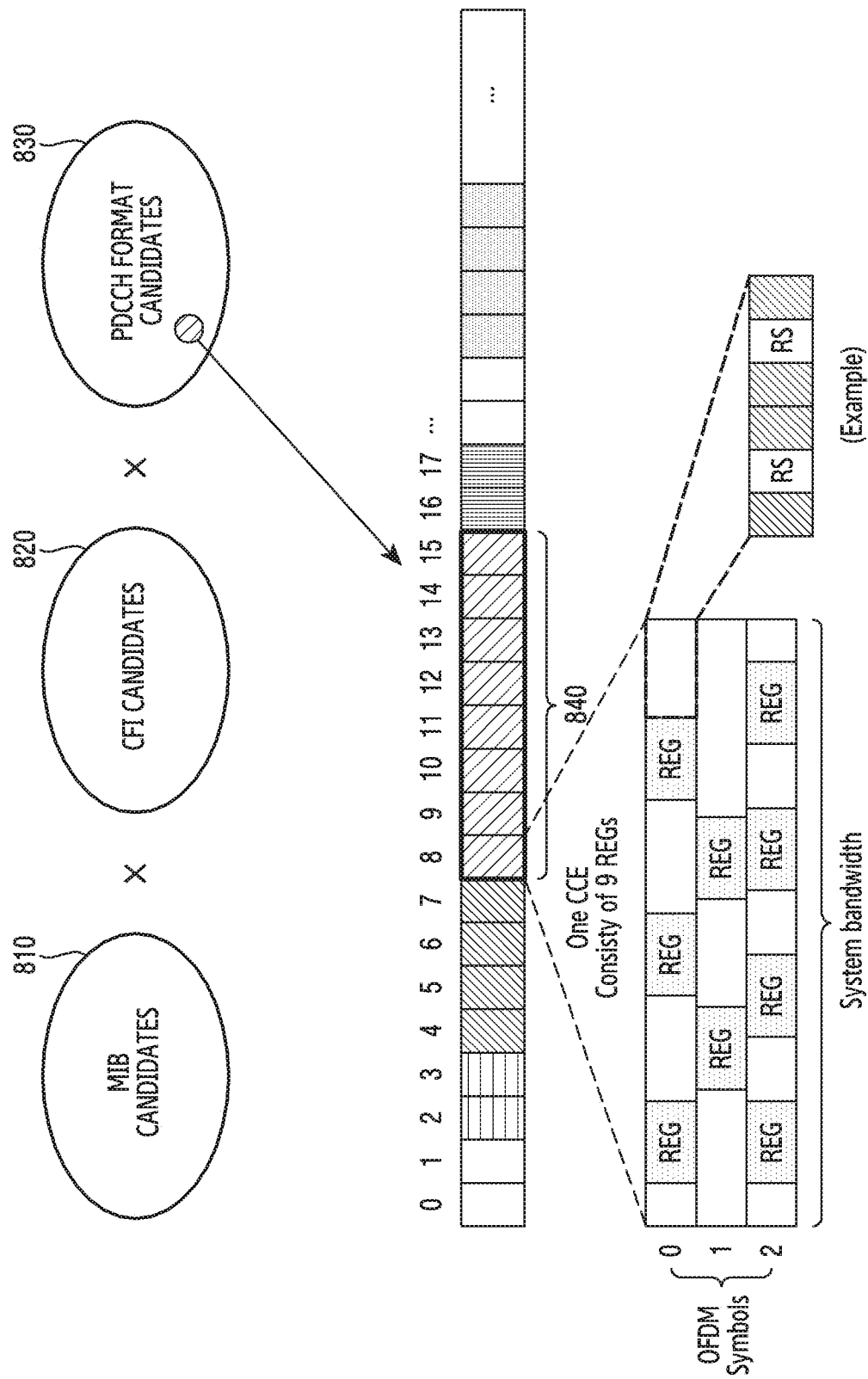
FIG. 8 illustrates an example of a decoding scheme based on a Physical Downlink Control Channel (PDCCH) format of an electronic device according to various embodiments of the disclosure.

FIG. 8 illustrates an example of a decoding scheme based on a PDCCH format of an electronic device according to various embodiments of the disclosure. The electronic device may be the electronic device 120 of FIG. 1.

Referring to FIG. 8, the electronic device 120 may determine decoding conditions on the basis of MIB candidates 810 and CFI candidate 820. The electronic device 120 may repeatedly perform PDCCH decoding for each of the decoding conditions. The electronic device 120 may repeatedly perform the PDCCH decoding according to PDCCH format candidates 830 in addition to the MIB candidates 810 and the CFI candidates 820.

In general, the PDCCH consists of a Control Channel Element (CCE). The CCE consists of 9 resource element groups. The CCE may be distributed to a system bandwidth and an OFDM symbol through interleaving to reduce interference and to ensure diversity. In the PDCCH, the number of CCEs may be referred to as a CCE aggregation level. The PDCCH format may be determined according to the CCE aggregation level. If the CCE aggregation level is 1, 2, 4, or 8, the PDCCH format may be determined respectively as #0, #1, #2, or #3. In one subframe, different PDCCHs may use different aggregation levels.

Although there are 4 PDCCH formats, a greater number of the PDCCH format candidates 830 may be identified according to a DCI format and whether a search space in the PDCCH is a UE-Specific Space (USS) or a Common Search Space (CSS). The number of specific cases is as shown in Table 1 below.

TABLE 1

| Search space | | | Number of PDCCH |
|---|---|---|---|
| Type | Aggregation level | Size (in CCEs) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 1 above, in the USS, since the total number of PDCCH candidates is 16 and there are two DCI formats to be considered, the number of PDCCH format candidates is 32 (16×2). Further, in the CSS, since the total number of PDCCH candidates is 6 and there are two DCI formats to be considered, the number of PDCCH format candidates is 12 (6×2). Therefore, the total number of PDCCH format candidates 830 that can be identified is 44. That is, the electronic device 120 may perform a blind decoding operation 44 times for one decoding condition.

A code rate may be used as an index indicating a robustness to an error. Error detection and error correction capabilities are excellent when the code rate is low. In general, in case of PBCH decoding and PDCCH decoding, since the same channel coding is used, basic performance thereof is determined according to the code rate to be used. In the PBCH, the same data is transmitted four times with a period of 10 ms. Specifically, one BCH transport block is transmitted one time every 40 ms, and is multiplexed in a physical layer so that each of four pieces of information is transmitted in one frame. Accordingly, if a first MIB cannot be decoded, a subsequent MIB may have a lower code rate by adding an LLR of information to an MIB to be transmitted next. A code rate of an MIB according to a transmission count is as shown in the following table.

TABLE 2

| MIB coding rate | $1^{st}$ transmission | $2^{nd}$ transmission | $3^{rd}$ transmission | $4^{th}$ transmission |
|---|---|---|---|---|
| Normal CP | 0.083 | 0.042 | 0.028 | 0.021 |
| Extended CP | 0.093 | 0.046 | 0.031 | 0.023 |

Meanwhile, when PDCCH decoding is performed, in the CSS, a code rate for a DCI on the basis of each bandwidth is as shown in the following table.

TABLE 3

| | | | DCI coding rate | |
|---|---|---|---|---|
| DCI format | Bandwidth | DCI bits with CRC | PDCCH format 2 | PDCCH format 3 |
| 1A | 5 | 41 | 0.14 | 0.07 |
| | 10 | 42 | 0.15 | 0.07 |

TABLE 3-continued

| | | | DCI coding rate | |
|---|---|---|---|---|
| DCI format | Bandwidth | DCI bits with CRC | PDCCH format 2 | PDCCH format 3 |
| 1C | 20 | 44 | 0.15 | 0.08 |
| | 5 | 28 | 0.10 | 0.05 |
| | 10 | 29 | 0.10 | 0.05 |
| | 20 | 31 | 0.10 | 0.05 |

Referring to Table 2 and Table 3, although a DCI code rate is lower than an MIB code rate in general, there is a case where the DCI code rate is lower when a PDCCH format is 3. When decoding is performed, since it is required to guarantee a decoding success rate greater than or equal to a specific level also in a scenario which exhibits the worst performance among a plurality of scenarios, the electronic device 120 may be required to decode the PDCCH irrespective of a PDCH decoding result. Accordingly, the electronic device 120 may repeatedly perform decoding for all of decoding conditions determined based on the MIB candidates and the CFI candidates, thereby preventing a procedural latency based on a PBCH or PCFICH decoding failure and decreasing an error rate compared to a sequential decoding operation.

By performing the repeated decoding, the electronic device 120 may improve decoding performance for a case of having a high CCE aggregation level compared to the conventional sequential decoding scheme, similarly to a case where the PDCCH format is 3. A higher CCE aggregation level can provide a better coding rate and reliability compared to a receiving device under a poor wireless environment. For example, the electronic device 120 may determine that a DCI code rate is relatively low when the CCE aggregation level is 8.

The electronic device 120 may repeatedly perform the PDCCH decoding by limiting the format to a format of a PDCCH having a lower code rate than a code rate of the MIB. In some embodiments, the electronic device 120 may select one of a plurality of decoding conditions based on the MIB candidates and the CFI candidates, and may limit PDCCH format candidates to a case where a CCE aggregation level is 8 when decoding is repeatedly performed according to the PDCCH format. According to Table 1 above, the number of cases based on the PDCCH format may be decreased from 44 times to 8 times. For a case where the CCE aggregation level is 8, the electronic device 120 may perform PDCCH decoding for each of the plurality of decoding conditions. For the other CCE aggregation levels, the electronic device 120 may perform the PDCCH decoding after performing PBCH decoding and PCFICH decoding similarly to the conventional sequential decoding scheme. The electronic device 120 may decrease a range of blind decoding according to a PDCCH format, a DCI format, and a search space, thereby decreasing a procedural latency and maximizing an effect of a decoding scheme based on the MIB candidates and the CFI candidates.

Figure 9:
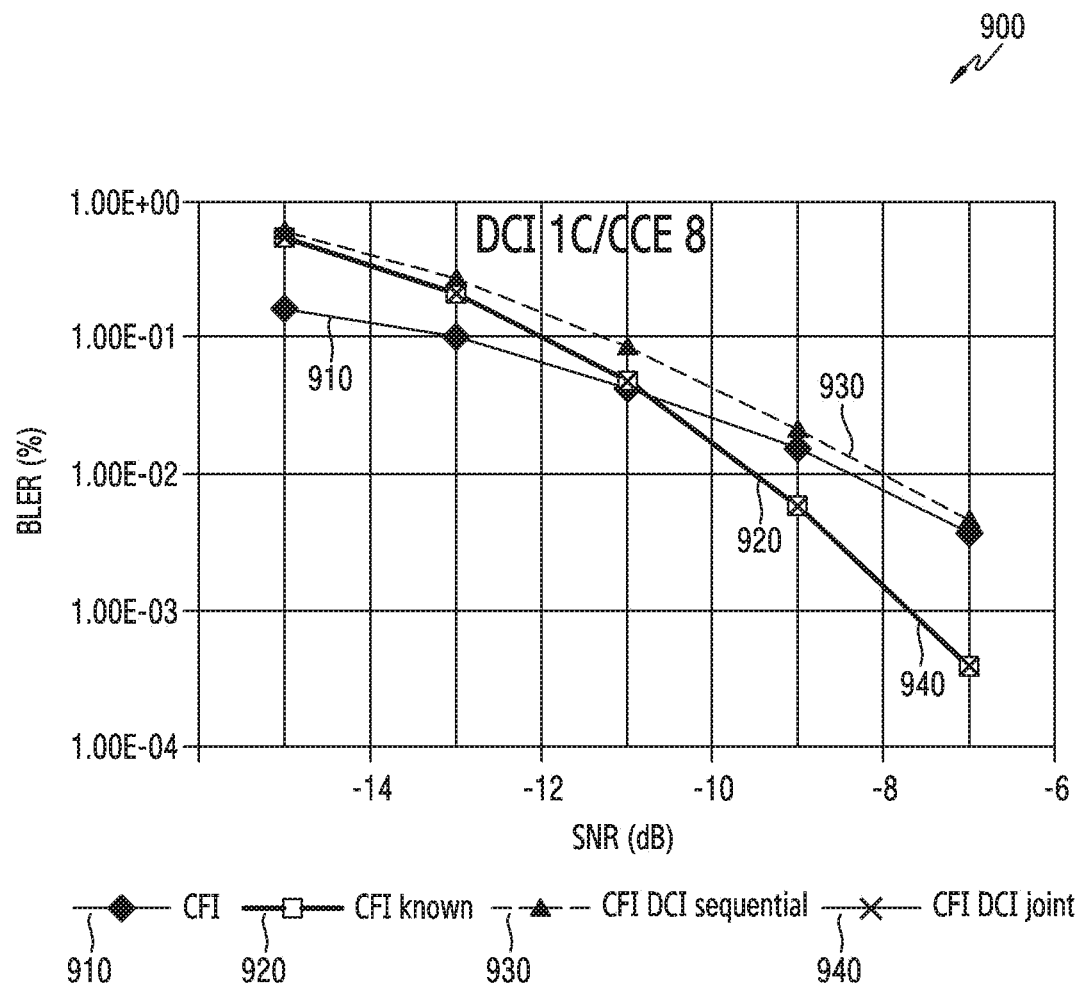
FIG. 9 is a graph for illustrating decoding performance of an electronic device according to various embodiments of the disclosure.

FIG. 9 is a graph for illustrating decoding performance of an electronic device according to various embodiments of the disclosure. The electronic device may be the electronic device 120 of FIG. 1. A decoding scheme according to various embodiments of the disclosure may be referred to as system blind decoding in the following description.

Referring to FIG. 9, a graph 900 shows a Block Error Rate (BLER) with respect to a Signal-to-Noise Ratio (SNR). In the graph 900, a horizontal axis represents an SNR value, and a vertical axis represents a BLER. A unit of the horizontal axis is Decibel (dB), and a unit of the vertical axis is percent (%). The graph 900 is a graph showing performance of decoding performed based on CFI candidates and an MIB value which has already been acquired. The graph 900 may include typical PCFICH decoding 910, PDCCH decoding 920 when a CFI value is known, sequential decoding 930 in which PDCCH decoding is performed after PCFICH decoding is performed, and system blind decoding 940 according to various embodiments of the disclosure. The decoding 910 to the decoding 940 are performed under the condition of a CCE aggregation level 8 and a DCI format 1C.

Referring to the graph 900, it can be seen that the decoding 940 according to the disclosure has a lower BLER than the sequential decoding 930. That is, it can be seen that the system blind decoding is more robust to an error than sequential decoding. In addition, it can be seen that the decoding 940 has the same BLER as the PDCCH decoding 920 when a CFI value is known. In other words, it can be seen that performance of the system blind decoding corresponds to PDCCH decoding performance irrespective of PCFICH decoding performance. The system blind decoding can decrease uncertainty in PCFICH decoding by repeatedly performing decoding.

Although a case where an MIB value has already been acquired is described in FIG. 9, the same performance may be obtained in the opposite case. Specifically, the system blind decoding may acquire decoding performance corresponding to PDCCH decoding performance irrespective of PBCH decoding performance or PCFICH decoding performance. When a set X denotes a set of decoding configuration conditions for MIB candidates and CFI candidates in the system blind decoding X and when $X_l$ denotes one decoding condition, the following equation may be used.

$$X_l \in \text{set} X, l=0,1,\ldots,\text{size}(X)-1 \quad (1)$$

size(x) denotes the number of decoding configuration conditions. If a PDCCH decoding success probability is defined as P(Y), the PDCCH decoding success probability is acquired by the following equation when decoding is repeatedly performed for all of the decoding configuration conditions.

$$\sum_{l=0}^{\text{size}(X)-1} P(X_l)P(Y|X_l)=P(Y) \quad (2)$$

According to Equation (2) above, the electronic device 120 can acquire the same performance effect as PDCCH decoding for a case where a real MIB and a real CFI are known, through system blind decoding in which PDCCH decoding is repeatedly performed for all decoding conditions.

While the disclosure has been shown and described with reference to certain preferred embodiments thereof, various changes in form and details may be made therein without departing from the spirit and scope of the disclosure. Therefore, the scope of the disclosure is defined not by the detailed description thereof but by the appended claims, and all differences within equivalents of the scope will be construed as being included in the disclosure.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

What is claimed is:

1. An electronic device in a wireless communication, comprising:
   at least one transceiver; and
   at least one processor operatively coupled to the at least one transceiver and configured to:
      identify decoding conditions associated with a physical downlink control channel (PDCCH) region based on candidates of at least one parameter indicated by master information block (MIB),
      receive a signal,
      based on identifying that a control channel of the signal according to at least one decoding condition among the decoding conditions associated with the PDCCH region is decoded, store the at least one decoding condition, and
      identify one decoding condition among the at least one decoding condition based on a reliability,
   wherein the at least one parameter indicated by the MIB comprises information on a control region in a frequency domain.

2. The electronic device of claim 1,
   wherein the at least one parameter comprises a bandwidth in which the signal is transmitted.

3. The electronic device of claim 1, wherein the at least one processor is further configured to:
   based on identifying a failure of the decoding of the control channel, decode the control channel of the signal according to another decoding condition among the decoding conditions associated with the PDCCH region.

4. The electronic device of claim 1, wherein the at least one processor is further configured to:
   obtain downlink control information (DCI) transferred through the control channel based on identifying that the control channel is decoded; and
   perform a decoding of a physical downlink shared channel (PDSCH) based on the DCI.

5. The electronic device of claim 1, wherein the at least one processor is further configured to:
   identify control information based on the identified one decoding condition; and
   decode a data region of the signal based on the identified control information.

6. The electronic device of claim 1,
   wherein the at least one processor is further configured to:
      decode the control channel of the signal based on a control channel format of control information having a lower code rate than a code rate of the MIB, and
   wherein a control channel element (CCE) aggregation level of the control channel format is 8.

7. The electronic device of claim 1,
   wherein the candidates of at least one parameter indicated by MIB are obtained in case that a code rate of the control channel is lower than a code rate of the MIB.

8. The electronic device of claim 1,
   wherein the at least one parameter comprises parameters indicating a time-frequency domain for the signal, and
   wherein the candidates are determined based on a combination of possible values of each of the parameters.

9. The electronic device of claim 1,
   wherein the decoding conditions are further determined based on candidates for a structure of the control channel of the signal, and
   wherein the candidates for the structure of the control channel are determined based on at least one of a number of antennas used to transmit the signal or channel allocation for acknowledge (ACK)/negative-acknowledge (NACK) transmission.

10. The electronic device of claim 1,
    wherein the information indicates a number of a resource blocks (RBs) allocated in the control region in the frequency domain, and
    wherein the signal is transmitted on the control region.

11. The electronic device of claim 1,
    wherein the control region comprises control resource set (CORESET), and
    wherein the signal comprises another system information.

12. A method for operating an electronic device in a wireless communication, comprising:
    identifying decoding conditions associated with a physical downlink control channel (PDCCH) region based on candidates of at least one parameter indicated by master information block (MIB);
    receiving a signal;
    based on identifying that a control channel of the signal according to at least one decoding condition among the decoding conditions associated with the PDCCH region is decoded, storing the at least one decoding condition; and
    identifying one decoding condition among the at least one decoding condition based on a reliability,
    wherein the at least one parameter indicated by the MIB comprises information on a control region in a frequency domain.

13. The method of claim 12,
    wherein the at least one parameter comprises at least one of a bandwidth in which the signal is transmitted.

14. The method of claim 12, further comprising:
    based on identifying a failure of the decoding of the control channel, decoding the control channel of the signal according to another decoding condition among the decoding conditions associated with the PDCCH region.

15. The method of claim 12, further comprising:
    obtaining downlink control information (DCI) transferred through the control channel based on identifying that the control channel is decoded; and
    performing a decoding of a physical downlink shared channel (PDSCH) based on the DCI.

16. The method of claim 12, further comprising:
    identifying control information based on the identified one decoding condition; and
    decoding a data region of the signal based on the identified control information.

17. The method of claim 12,
    wherein the candidates of at least one parameter indicated by MIB are obtained in case that a code rate of the control channel is lower than a code rate of the MIB.

18. The method of claim 12,
    wherein the at least one parameter comprises parameters indicating a time-frequency domain for the signal, and
    wherein the candidates are determined based on a combination of possible values of each of the parameters.

* * * * *